United States Patent Office 3,156,715
Patented Nov. 10, 1964

3,156,715
POLYFLUORINATED ORGANO-MERCURY COMPOUNDS AND THEIR PREPARATION
Robert N. Haszeldine, Windyridge, Lyme Road, Disley, England; Alan R. Parkinson, 25 Highview St., Deane, Bolton, England; and John M. Birchall, 22 Lorna Road, Cheadle Hulme, England
No Drawing. Filed Sept. 18, 1962, Ser. No. 224,515
10 Claims. (Cl. 260—433)

This invention relates to polyfluorinated organo-mercury compounds and to a method for their preparation by the reaction of a polyfluoroarylhydrazine with mercury or certain mercury compounds under oxidizing conditions.

Aryl mercury compounds in the hydrocarbon series, e.g. diphenyl mercury are well known.

In accordance with the present invention, a new class of aryl mercury compounds have been discovered in which the aryl radicals are polyfluorinated and preferably perfluorinated. These compounds have unique value as providing a source of polyfluoroaryl free radicals under neutral non-oxidizing conditions when subjected to thermal or photolytic activation. As will be set forth in more detail hereinafter, these properties permit the direct preparation of many polyfluoroaryl compounds which would be difficult to prepare by other means.

The new compounds of the invention may be represented by the general formula: $R_fHg$—X where $R_f$ is an aromatic radical attached to the mercury atom through an aromatic ring carbon atom and carrying fluorine on at least half and preferably two-thirds of its aromatic ring positions; and where X is selected from the group consisting of an $R_f$ radical (as defined above), chlorine, bromine, iodine and the acetate radical

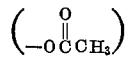

The preferred compounds are the diaryl mercury compounds of the general formula $R_f$—Hg—$R_f$.

The radical $R_f$ may be mononuclear, e.g. pentafluorophenyl or tetrafluorophenyl, or may contain 2 or more aromatic rings which may be of the condensed type as e.g. perfluoronaphthyl, perfluoroanthracenyl or perfluorophenanthryl, or may contain two or more coupled aromatic rings such as in a perfluorinated diphenyl radical, or a perfluorinated diphenyl methane radical. In addition to fluorine the ring may also contain other substituents such as alkyl, haloalkyl, halogen, particularly chlorine and bromine, aryl, nitro, alkoxy or phenoxy substituents. Preferably, the radical $R_f$ contains from 6 to 20 and most desirably from 6 to 12 carbon atoms. A preferred class of compounds are those which, in addition to carbon and fluorine, contain only hydrogen atoms in the $R_f$ radical, while a particularly preferred class are those in which the $R_f$ radical is a perfluorinated aryl radical, including those containing perfluoroalkyl substituents, such as the pentafluorophenyl radical, the heptafluoronaphthyl radical, the nonafluorodiphenyl radical, and the perfluoromethyltetrafluorophenyl radical, the bis(perfluoromethyl) trifluorophenyl radical and the like.

Typical compounds coming within the scope of the invention are the following:

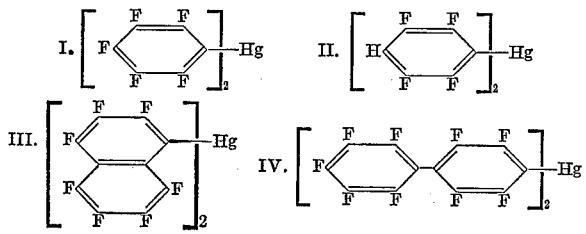

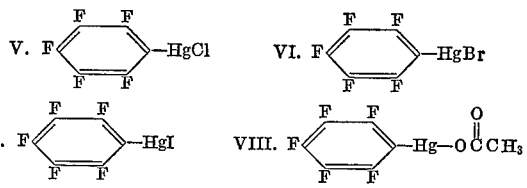

The compounds of the invention are prepared by the reaction, under oxidizing conditions of a polyfluoroarylhydrazine, e.g. pentafluorophenylhydrazine, of the general formula:

$R_fNH$—$NH_2$ where $R_f$ is as defined above and where the —NH—$NH_2$ radical is attached to an aromatic nuclear carbon atom, with metallic mercury, mercury oxide (HgO) or with a mercury compound of the formula $HgX_2$ where X is as previously defined. This new method may be exemplified by the reaction of pentafluorophenylhydrazine with metallic mercury in the presence of an oxidizing agent in accordance with the following:

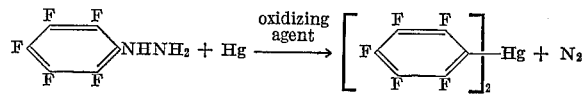

While the invention is not limited to, and does not depend upon, any particular reaction mechanism, it is believed that the reactions of the invention proceed through the formation of an intermediate transient diazo compound e.g. $C_6F_5N$=NH, prepared by the oxidation of the polyfluoroarylhydrazine which in turn undergoes homolytic decomposition to produce a polyfluoroaryl free radical with the evolution of nitrogen. In the reaction illustrated above, the free radical thus formed then attacks the mercury to form the diaryl mercury compound. The foregoing reaction mechanism may be exemplified by the oxidation of pentafluorophenylhydrazine in the presence of mercury:

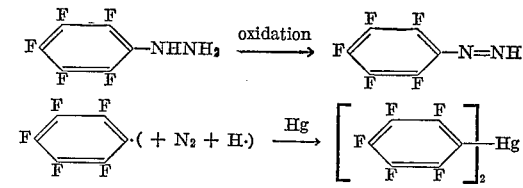

To provide the oxidizing conditions necessary for the reaction, a wide variety of oxidizing agents may be employed including, for example, heavy metal oxides such as silver oxide, mercury oxide and lead dioxide; oxidizing agents of the positive halogen type, such as bleaching powder [$CaOCl_2$], chloramine-T (sodium para-toluenesulfonchloramine) and the hypochlorites, hypobromites and hypoiodites of alkali metals (particularly sodium and potassium) or of the alkaline earths (particularly calcium); oxidizing agents containing oxidizing anions such as permanganates, dichromates, bismuthates, vanadates, chlorates, bromates, and iodates; compounds containing higher oxidation states of polyvalent transition metals such as compounds containing the cupric, ferric and ceric ion; air or oxygen, either alone or in the presence of a catalyst such as a cupric compound; peroxides and per-acids, such as hydrogen peroxide, and peracetic acid; or organic oxidizing agents such as quinones.

When metallic mercury or HgO is employed the reaction product is $R_f$—Hg—$R_f$. In the case of HgO alone (in the absence of metallic mercury) the HgO may furnish both the source of mercury and the necessary oxidizing conditions, the HgO being reduced in the course of reaction with the aryl hydrazine to furnish metallic mercury in situ. Thus in the case of HgO, no extraneous oxidizing agent is required. When metallic mercury is used however an oxidizing agent must be employed to furnish the oxidizing conditions. If desired a mixture of metallic mercury and HgO can be employed in which case the HgO, in addition to providing oxidizing conditions may provide additional metallic mercury by its reduction in situ.

When a mercury compound $HgX_2$ is employed (when X is as above defined) the product will be $R_fHgX$ or $R_f$—Hg—$R_f$ or both. In the case of $HgX_2$ the necessary oxidizing conditions are supplied by the use of one of the above listed oxidizing agents.

The polyfluorinated aryl hydrazine starting material may be readily prepared by the reaction of the corresponding polyfluorinated aryl compound, e.g. hexafluorobenzene, with hydrazine hydrate in an organic solvent such as ethanol or dioxane. The preparation of the hydrazine is preferably carried out in a cyclic ether solvent such as dioxane since it has been found that such solvents produce almost quantitative yields of a desired polyfluorinated aryl hydrazine such as pentafluorophenyl hydrazine. The polyfluorinated aryl hydrazines are generally crystalline solids.

In general, the reaction may be carried out at temperatures ranging from about —30° C. to about 180° C. and preferably at temperatures from about —10° C. to about 120° C. At temperatures above about 120° C. there is a greater tendency for side reactions to occur with consequent reduced yields and accordingly, temperatures below about 120° C. are preferred. Reaction pressure is not critical and the reaction is carried out most conveniently at atmospheric pressure although reduced or elevated pressures may be employed if desired. The molar ratios of the reactants are not critical although it will be generally preferred to employ a molar excess of mercury and/or the mercury compound to assure high conversions of the polyfluorinated aryl hydrazine. Reaction time is likewise not critical, reaction periods from about one-half to ten hours generally being sufficient to provide good conversions.

In accordance with one procedure, the reaction may be conveniently carried out by slowly adding the solid polyfluorinated aryl hydrazine to a vigorously agitated suspension of metallic mercury, HgO or $HgX_2$ (or mixtures thereof) in an inert liquid which is preferably a solvent for the polyfluorinated aryl hydrazine while maintaining oxidizing conditions.

In accordance with a second procedure, an oxidizing agent e.g. oxygen may be gradually added to a mixture of the polyfluoroarylhydrazine with metallic mercury and/or HgO and/or a compound $HgX_2$ while suspended in an inert liquid which is preferably a solvent for the polyfluoroarylhydrazine. The latter procedure is preferred where the oxidizing agent employed might tend to react with the mercury source on prolonged contact. Gradual addition of the oxidizing agent is believed advantageous under these conditions in that it permits the polyfluoroarylhydrazine to compete successfully for the oxidizing agent and so generate the polyfluoroaryl free radicals.

The reaction is exothermic and it may be necessary in some cases to cool the reaction mixture, e.g. by means of an ice bath to regulate the reaction and control the rate of oxidation. Nitrogen is evolved, usually quantitatively, by oxidation of the polyfluorinated aryl hydrazine. After the evolution of nitrogen ceases, it is generally desirable to raise the reaction temperature to insure completeness of reaction. The liquid medium in which the reaction is carried out should be relatively inert (i.e., one which is not appreciably attacked by either of the reactants) and is preferably one in which the polyfluorinated aryl hydrazine is soluble. Preferred liquid reaction media include, e.g. perfluorinated alkanes or cycloalkanes such as perfluoropentane, perfluorohexane, perfluoro(dimethylcyclobutane); although non-perfluorinated liquid media such as cyclohexane or hexane, carbon tetrachloride, or carbon disulfide may also be employed. To ensure adequate contact between the reactants, it is preferable that the reactants such as the metallic mercury be reduced to a finely-divided form. This may be accomplished by any of the well known techniques such as by reduction of a soluble mercury metal salt to precipitate the finely-divided metal.

The following examples are intended to illustrate the invention:

*Example 1.—Preparation of Bis(Pentafluorophenyl) Mercury*

Finely-divided mercury is prepared by the addition of dilute aqueous ammonia to mercurous nitrate (50 g.) in water (200 milliliters). The mixture is heated to boiling with an excess of glucose (150 g.) and the black precipitate which forms is washed with water, acetone, and ether and then dried in vacuo. To a flask equipped with a stirrer and reflux condenser there is introduced about 30 grams of finely-divided mercury prepared as described; 25.0 grams (0.11 mole) of mercuric oxide and 100 milliliters of perfluoropentane. To this mixture, while stirring, there is added over a period of about 2 hours 11.0 grams (0.055 mole) of pentafluorophenylhydrazine. The reaction is initiated by gentle refluxing after which nitrogen (1200 milliliters, 97%) is evolved smoothly while the temperature is maintained at 0 to 5° C. by means of an ice bath. The mixture is then heated under reflux for 1 hour, the solvent is distilled off and the black residue is extracted with ether (200 milliliters). Removal of the ether by distillation gives a mass of large colorless crystals which crumble to an amorphous powder weighing 10.1 grams in a vacuum desiccator. Recrystallization of this product from a light petroleum fraction (boiling point 60° to 80° C.) and sublimation in vacuo at 130° C. gives 9.5 grams (64% yield) of bis(pentafluorophenyl)mercury having a melting point of 140–141.5° C. of the formula:

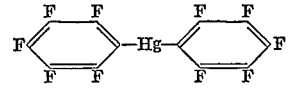

*Analysis.*—Calculated for: $C_{12}F_{10}Hg$, C, 27.0%. Found: C, 27.2%. The infrared spectrum of this compound shows a strong band at 1511 cm.$^{-1}$ consistent with the presence of the pentafluorophenyl group.

*Example 2.—Preparation of Bis(Tetrafluorophenyl) Mercury*

Following the procedures of Example 1, tetrafluorophenylhydrazine is substituted for pentafluorophenylhydrazine. There is obtained a good yield of bis(tetrafluorophenyl)mercury:

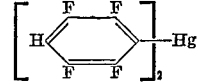

*Example 3.—Preparation of Bis(Heptafluoronaphthyl) Mercury*

Following the procedures of Example 1, heptafluoronaphthylhydrazine is substituted for pentafluorophenylhydrazine and there is obtained bis(heptafluoronaphthyl)-mercury:

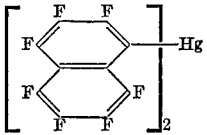

*Example 4.—Preparation of Pentafluorophenylmercuric Chloride*

To a flask equipped with a stirrer and reflux condenser, there is introduced 25 grams of mercuric oxide, 30 grams of mercuric chloride, and 100 milliliters of perfluoropentane. To this mixture, while stirring, there is added, over a period of about two hours, 11 grams of pentafluorophenylhydrazine. The reaction is initiated by gentle warming, after which nitrogen is evolved smoothly while the temperature is maintained at 0–5° C. by means of an ice bath. The mixture is then heated under reflux for fifteen minutes, the solvent is distilled off and the residue is purified to give a good yield of pentafluorophenylmercuric chloride:

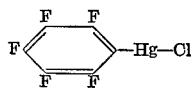

*Example 5.—Preparation of Bis(Pentafluorophenyl) Mercury Without the Addition of Finely-Divided Mercury*

To a flask equipped with a stirrer and reflux condenser, there is introduced 25 grams of mercuric oxide and 100 milliliters of perfluoropentane. To this mixture, while stirring, there is added, over a period of about two hours, 11 grams of pentafluorophenylhydrazine. The reaction is initiated by gentle warming, after which nitrogen is evolved smoothly while the temperature is maintained at 0–5° C. by means of an ice-bath. The mixture is then heated under reflux for one hour, the solvent is distilled off, and the residue is extracted with ether. Evaporation of the ether and recrystallization of the residue from light petroleum gives a good yield of bis(pentafluorophenyl) mercury, M.P. 140–141.5° C.

*Example 6.—Preparation of Bis(Pentafluorophenyl) Mercury With Gaseous Oxygen as Oxidizing Agent*

A stream of oxygen is passed through a vigorously stirred suspension of 30 grams of finely divided mercury and 10 grams of pentafluorophenylhydrazine in 100 milliliters of refluxing perfluoropentane for twenty-four hours. The solvent is then distilled off, and the residue is extracted with ether. The extracts are evaporated and the residue is recrystallized from light petroleum to give a good yield of bis(pentafluorophenyl)mercury, M.P. 164–165° C.

The compounds of the invention are particularly useful as intermediates for the preparation of compounds containing polyfluorinated aryl groups. In this connection, and as mentioned previously, they have unique value in that they provide a source of polyfluoroaryl free radicals under neutral, non-oxidizing conditions. While compounds such as pentafluorophenylhydrazine are capable of providing polyfluoroaryl free radicals it is necessary in such cases to generate the free radical under oxidizing conditions, and furthermore, the hydrazine itself is basic in character and thus may tend to react directly with the acid group of acidic materials instead of providing a polyfluoroaryl free radical. Where it is desired for example, to introduce a polyfluoroaryl radical, e.g. C₆F₅—, into a compound sensitive to oxidation such as benzyl alcohol or phenyldimethylamine this may be accomplished by thermally or photolytically activating a compound of the invention, e.g. bis(pentafluorophenyl)mercury while in contact with the oxidation-sensitive compound to produce the desired polyfluoroaryl derivative, e.g.

$$C_6F_5—C_6H_4CH_2OH$$

or C₆F₅—C₆H₄—N(CH₃)₂. Similarly, the C₆F₅-radical generated from Hg[C₆F₅]₂ photolytically or thermally under neutral conditions can be introduced into compounds such as benzoic acid (to give $$C_6F_5—C_6H_4—COOH)$$

where basic compounds such as pentafluorophenylhydrazine would tend to give a salt with the carboxylic acid group rather than generating the desired C₆F₅-radical.

In like manner, in other cases where the use of a fluorinated aryl hydrazine as a source of the polyfluoroaryl free radical might tend to lead to preferential combination of the hydrazino group (e.g. where it is desired to introduce a pentafluorophenyl group into an aromatic ketone such as diphenyl ketone) the bis(pentafluorophenyl)mercury compound is a preferred source of the C₆F₅-radical since it does not lead to preferential combination with the carbonyl group as in the case of the hydrazino group.

The compounds of the invention are also useful as a source of polyfluoroaryl free radicals in polymerization reactions in place of the more conventional radical sources such as ditertiary butyl peroxide (yielding a CH₃-radical) benzoyl peroxide (furnishing a C₆H₅-radical) or azodiisobutyrnitrile (yielding a —C(CH₃)₂CN radical). The free radical, supplying as it does the terminal group of the polymer chain, affects the properties of the polymer. The superior chemical and thermal stability of the polyfluoroaryl radicals, particularly of the perfluorinated type, is of advantage where a highly stable polymer is desired. In the preparation for example of short chain polymers of fluoro-olefins such as CF₂=CF₂, CF₂=CFCl or $$CF_3CF=CF_2$$

for use as stable hydraulic fluids, greases, chemically resistant waxes etc., it is important to have very stable endgroups R in the polymer R(olefin)ₙR. By using the compounds of the invention e.g. Hg(C₆F₅)₂ as a source of polyfluoroaryl free radicals there may be obtained e.g. short chain polymers of tetrafluoroethylene such as $$C_6F_5[CF_2CF_2]_nC_6F_5$$

of enhanced stability.

The compounds of the invention are also useful as fungicides, bactericides and insecticides. For such applications, they may be applied in the form of a fine powder diluted with an inert powder carrier such as talc or the like.

It is to be understood that the foregoing description and specific embodiments are intended to be illustrative of the invention and that variations and modifications in addition to those specifically disclosed are included with the scope of the invention.

We claim:

1. Compounds of the general formula R_f—Hg—X where R_f is a carbocyclic aromatic radical containing benzenoid unsaturation, said radical being attached to the mercury atom through an aromatic ring carbon atom and carrying fluorine on at least half of its aromatic ring positions, and where X is selected from the class consisting of an R_f radical, chlorine, bromine, iodine and the acetate radical.

2. Compounds in accordance with claim 1 in which R_f is a perfluorinated carbocyclic aromatic radical containing benzenoid unsaturation.

3. Compounds in accordance with claim 1 in which R_f is nononuclear.

4. Compounds in accordance with claim 1 in which R_f is a pentafluorophenyl radical.

5. Compounds of the general formula R_f—Hg—R_f where R_f is a carbocyclic aromatic radical containing benzenoid unsaturation, said radical being attached to the mercury atom through an aromatic ring carbon atom and carrying fluorine on at least half of its aromatic ring positions.

6. Compounds in accordance with claim 5 in which R_f is a perfluorinated, carbocyclic, mononuclear aromatic radical containing benzenoid unsaturation.

7. The compound bis(pentafluorophenyl)mercury.

8. A method for preparing compounds of the general formula R_f—Hg—R_f where R_f is a perfluorinated carbocyclic aromatic radical containing benzenoid unsaturation, said radical being attached to the mercury atom through an aromatic ring carbon atom, and carrying fluorine on at least half of its aromatic ring positions which comprises the step of reacting under oxidizing conditions at a temperature of −30° C. to +180° C., a perfluorinated aryl hydrazine having the formula $R_f$—$NHNH_2$, where $R_f$ is as defined above, with a reagent selected from the class consisting of metallic mercury and HgO.

9. A method in accordance with claim 8 in which said reagent is a mixture of metallic mercury and HgO.

10. A method in accordance with claim 8 in which said perfluorinated aryl hydrazine is pentafluorophenylhydrazine.

No references cited.

TOBIAS E. LEVOW, *Primary Examiner.*

UNITED STATES PATENT OFFICE
CERTIFICATE OF CORRECTION

Patent No. 3,156,715            November 10, 1964

Robert N. Haszeldine et al.

It is hereby certified that error appears in the above numbered patent requiring correction and that the said Letters Patent should read as corrected below.

Column 5, line 43, for "164-165° C." read -- 140-141.5° C. --.

Signed and sealed this 30th day of March 1965.

(SEAL)
Attest:

ERNEST W. SWIDER
Attesting Officer

EDWARD J. BRENNER
Commissioner of Patents